H. E. ELLIS.
APPARATUS FOR PRODUCING OZONE.
APPLICATION FILED DEC. 10, 1920.
1,417,046.
Patented May 23, 1922.
2 SHEETS—SHEET 1.
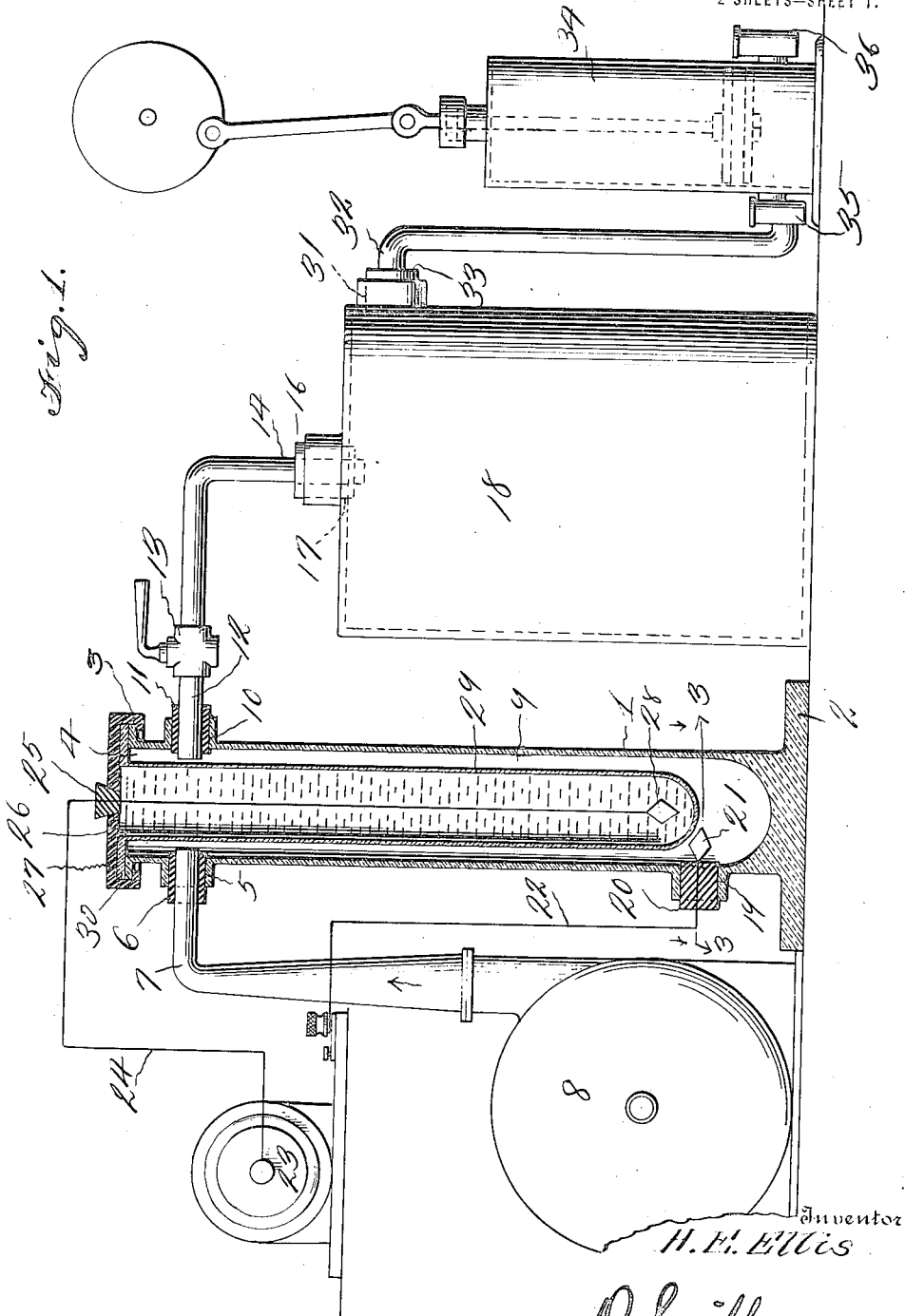

H. E. ELLIS.
APPARATUS FOR PRODUCING OZONE.
APPLICATION FILED DEC. 10, 1920.
1,417,046.
Patented May 23, 1922.
2 SHEETS—SHEET 2.
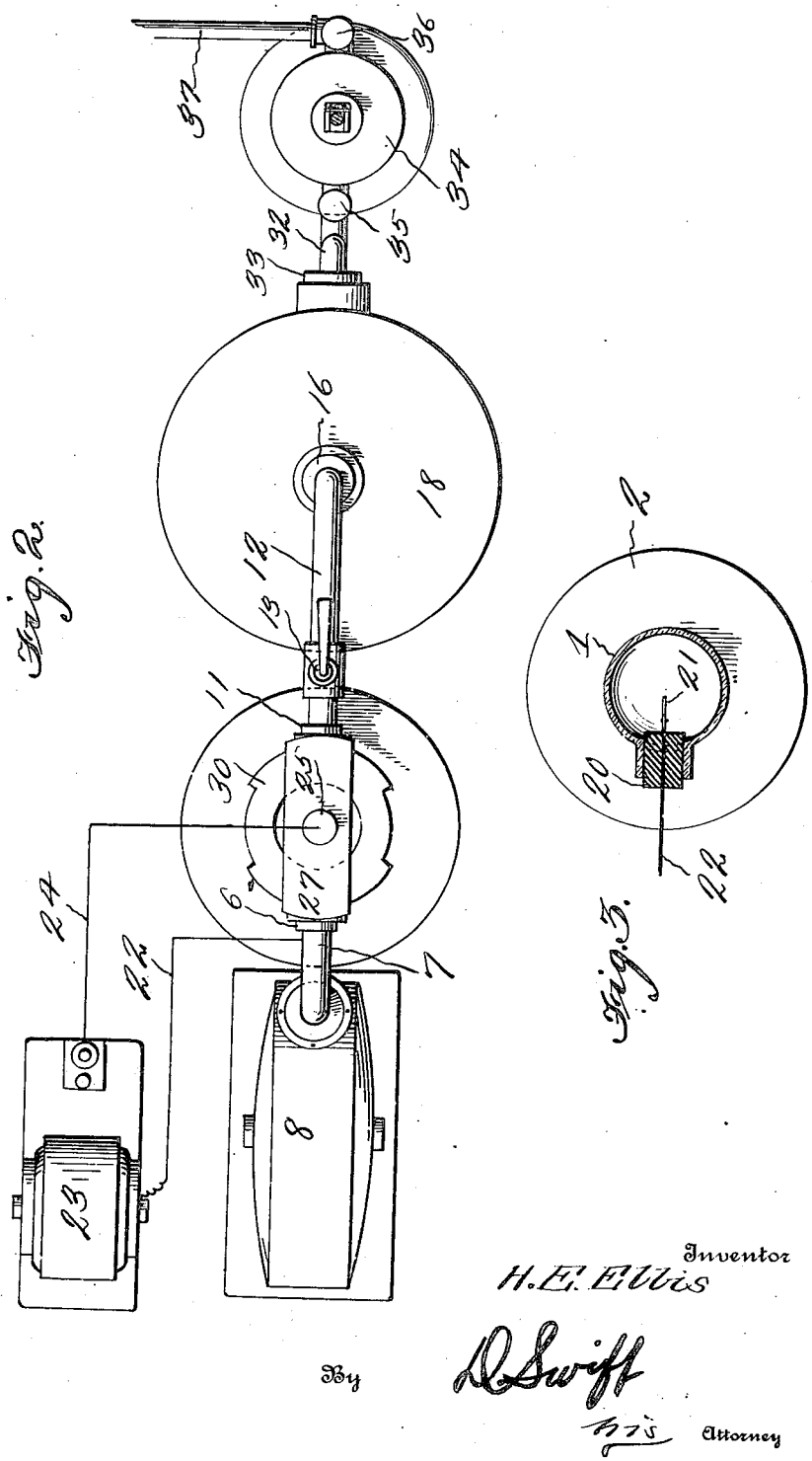
Inventor
H. E. Ellis
By D. Swift
Attorney

UNITED STATES PATENT OFFICE.

HARRY ELLWOOD ELLIS, OF JACKSONVILLE, FLORIDA.

APPARATUS FOR PRODUCING OZONE.

1,417,046.   Specification of Letters Patent.   Patented May 23, 1922.

Application filed December 10, 1920. Serial No. 429,655.

*To all whom it may concern:*

Be it known that I, HARRY ELLWOOD ELLIS, a citizen of the United States, residing at Jacksonville, in the county of Duval, State of Florida, have invented a new and useful Apparatus for Producing Ozone; and I do hereby declare the following to be a full, clear, and exact description of the invention, such as will enable others skilled in the art to which it appertains to make and use the same.

The invention relates to apparatus for producing ozone gas from air. Ozone has heretofore been employed only a very limited extent in the arts for the reason that its production in quantity and at low cost has been impossible, therefore it is also an object of the invention to provide an apparatus wherein quantity production may be obtained at a low cost.

A further object is to provide an ozone producing apparatus comprising a cylindrical glass receptacle having disposed therein and in spaced relation to the inner wall thereof, a second cylindrical glass receptacle in which second cylindrical glass receptacle water is disposed and a platinum electrode adjacent the lower end thereof, said electrode being in circuit with a transformer, which transformer is in circuit with a second electrode disposed within the cylindrical receptacle and adjacent the lower end of the second cylindrical receptacle. Also to provide a blower in connection with the interior of the main receptacle whereby air may be forced into the main receptacle where ozone may be separated from the air. Also to provide means whereby the ozone in the main receptacle will be conveyed through a receptacle and a pump for storage purposes and the other products of the air will be left in the receptacle.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the apparatus showing the spaced cylinders in section.

Figure 2 is a top plan view of the apparatus.

Figure 3 is a horizontal sectional view taken on line 3—3 of Figure 1.

Referring to the drawings, the numeral 1 designates a cylindrical shaped glass receptacle having a base 2 at its lower end and a flange 3 at its upper end adjacent the mouth 4 of the receptacle. The upper end of the receptacle 1 is provided with a flanged opening 5 which opening has disposed therein a rubber sleeve 6 for the reception of an air supply pipe 7, which pipe is connected to a conventional form of blower 8 for supplying air to the chamber 9 of the main receptacle 1. The main receptacle 1 adjacent its upper end and preferably diametrically disposed in relation to the flanged opening 6 is provided with a flanged opening 10 having therein a rubber sleeve 11 for the reception of the discharge pipe 12, which discharge pipe is provided with a valve 13 whereby a flow through the pipe 12 may be controlled. The discharge pipe 12 has its end 14 disposed in a plug 16, which plug is preferably made of rubber and is disposed in a flanged opening 17 of a glass receptacle 18.

In an opening 19 adjacent the base 2 of the main receptacle 1 is a rubber plug 20, which rubber plug has extending inwardly therefrom a platinum electrode 21, there being a wire 22 in connection with said platinum electrode, which wire is in circuit with a step-up transformer 23, which transformer discharges approximately at three thousand volts at approximately thirty thousand alternations a second, said transformer getting its power from a generator or any other source of power. The other side of the transformer 23 has connected thereto a wire 24, which wire extends downwardly through a rubber plug 25 disposed in an aperture 26 of a cover 27 and has connected to its lower end an electrode 28 which electrode is disposed adjacent the bottom of an auxiliary glass receptacle 29. The auxiliary glass receptacle 29 at its upper end is provided with a flange 30 which rests on the flange 3 and is held thereon and in close engagement therewith by the cover 27. Cover 27 is preferably formed from hard rubber and the joints between the flanges 30 and 3 are preferably airtight. Water is placed within the auxiliary receptacle 29 and extends substantially to the top thereof, so that the electrode 28 is suspended in the water. The wire 24 is connected to the positive pole of the transformer 23, while the wire 22 is connected to a negative pole of the transformer.

In the upper part of the glass receptacle 18 is an opening 31, into which is fitted a pipe 32 through a rubber insulating sleeve 33. The pipe 32 is connected to an air pump 34 having the usual inlet and outlet valves 35 and 36. The air pump is connected by means of a pipe 37 from the valve 36 to a storage tank or a gasometer, not shown. To operate the apparatus; the auxiliary receptacle 29 is filled with water almost to the top. The dynamo, not shown, blower and air pipe are then put into operation, the current turned on to the transformer. The air driven by the fan or blower 8 passes around the auxiliary glass receptacle 29 and circulates in the space between the outer wall of the auxiliary receptacle and the inner wall of the main receptacle. The valve 13 may be regulated to retard the passage of the gas from the chamber 9 so that a very low pressure is maintained in said chamber. The high tensioned current passing between the poles 28 and 21 causes the air in its passage between the walls of the main and auxiliary receptacle to liberate ozone freely which passes off by the pipe 12 into the vessel or glass receptacle 18, thence through the pipe 32, through air pump 34, pipe 27 and thence to a storage tank or gasometer. The vessel or glass receptacle 18 is for the purpose of receiving the moisture which comes over with the ozone gas.

From the above it will be seen that an apparatus is provided wherein it will be possible to produce ozone gas in large quantities and cheaply.

The invention having been set forth what is claimed as new and useful is:—

1. An apparatus for producing ozone gas, said apparatus comprising a main receptacle, an auxiliary receptacle disposed within the main receptacle for the reception of water, said auxiliary receptacle provided with a flange engaging a flange of the main receptacle, the upper end of said auxiliary receptacle being opened, a member extending across the upper end of the auxiliary receptacle, an electrode disposed within the auxiliary receptacle and suspended from the member extending across the upper end thereof, said member also forming means for securing the receptacles together, an electrode disposed within the chamber of the main receptacle adjacent the lower end thereof and means for forcing air through the main receptacle.

2. An apparatus for producing ozone gas, said apparatus comprising a main receptacle for the reception of air, an auxiliary receptacle disposed within the main receptacle and adapted to be filled with water, flanges carried by the upper ends of said receptacles, and overlying each other, a bar extending across the upper ends of said receptacle provided with lugs, overlying and underlying the flanges and forming means for securing the receptacles together, the upper end of the chamber of the auxiliary receptacle being in communication with the atmosphere, and electrodes located adjacent each other, one of said electrodes being disposed within the lower end of the auxiliary receptacle and the other electrode disposed in the lower end of the main receptacle.

In testimony whereof I have signed my name to this specification in the presence of two subscribing witnesses.

HARRY ELLWOOD ELLIS.

Witnesses:
F. L. GINTY,
R. P. KETTLE.